United States Patent
Martini et al.

(10) Patent No.: US 9,055,111 B1
(45) Date of Patent: Jun. 9, 2015

(54) SOFT WEBSITE BLOCK OVERRIDE

(71) Applicant: Phantom Technologies, Inc., San Diego, CA (US)

(72) Inventors: Paul Michael Martini, San Diego, CA (US); Peter Anthony Martini, San Diego, CA (US)

(73) Assignee: iboss, Inc., San Diego, CA (US)

( * ) Notice: Subject to any disclaimer, the term of this patent is extended or adjusted under 35 U.S.C. 154(b) by 0 days.

(21) Appl. No.: 14/188,549

(22) Filed: Feb. 24, 2014

(51) Int. Cl.
*H04L 29/06* (2006.01)

(52) U.S. Cl.
CPC .............. *H04L 63/20* (2013.01); *H04L 63/101* (2013.01); *H04L 63/105* (2013.01); *H04L 63/10* (2013.01)

(58) Field of Classification Search
CPC ...... H04L 63/10; H04L 63/105; H04L 63/101
USPC .......................................................... 726/1
See application file for complete search history.

(56) References Cited

U.S. PATENT DOCUMENTS

2004/0006710 A1* 1/2004 Pollutro et al. ............... 713/201
2011/0162033 A1* 6/2011 Feinstein et al. ................. 726/1

OTHER PUBLICATIONS

ContentWatch, Inc., "Net Nanny Features" 2014, Downloaded from the internet at: http://www.netnanny.com/features/internet-filter on Jan. 15, 2014, 5 pages.
ContentWatch, Inc., "Net Nanny for Windows FAQs" 2014, Downloaded from the internet at: http://www.netnanny.com/support/top15/ on Jan. 15, 2014, 9 pages.
TopLang Software, "Internet Lock 6", 2014, Downloaded from the internet at: http://www.toplang.com/internetlock.html on Jan. 15, 2014, 2 pages.

* cited by examiner

*Primary Examiner* — William Goodchild
(74) *Attorney, Agent, or Firm* — Fish & Richardson P.C.

(57) ABSTRACT

Methods, systems, and apparatus, including computer programs encoded on computer storage media, for overriding a soft website block. One of the methods includes receiving, from a user device, a request to access a resource, determining, using a first policy group for the user device, that the user device should be prevented from accessing the resource, providing, to the user device and based on determining that the user device should be prevented from accessing the resource, instructions for the presentation of a user interface including a user credentials field, receiving user credentials from the user device, determining that the user credentials are the same as credentials used to log onto the user device, and allowing the user device access to the resource.

36 Claims, 4 Drawing Sheets

SOFT WEBSITE BLOCK OVERRIDE

TECHNICAL FIELD

This specification relates to systems and techniques that facilitate allowing a user device access to a blocked website.

BACKGROUND

Some network systems may restrict a device's access to predetermined resources or categories of resources. For example, a system may block webpages that are known to host malicious code or contain offensive content.

SUMMARY

In general, one aspect of the subject matter described in this specification can be embodied in methods that include the actions of receiving, from a user device, a request to access a resource, determining, using a first policy group for the user device, that the user device should be prevented from accessing the resource, providing, to the user device and based on determining that the user device should be prevented from accessing the resource, instructions for the presentation of a user interface including a user credentials field, receiving user credentials from the user device, determining that the user credentials are the same as credentials used to log onto the user device, and allowing the user device access to the resource. Other implementations of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them, installed on the system that in operation causes or cause the system to perform the actions. One or more computer programs can be configured to perform particular operations or actions by virtue of including instructions that, when executed by data processing apparatus, cause the apparatus to perform the actions.

The foregoing and other implementations can each optionally include one or more of the following features, alone or in combination. In particular, one implementation may include all the following features in combination. The method may comprise receiving the user credentials from the user device during a login process, determining that the first policy group should be associated with the user device based on the receipt of the user credentials during the login process, and applying the first policy group to communications for the user device. The method may comprise identifying a second policy group for the user device using the user credentials, and determining, using the second policy group for the user device, that the user device should be allowed access to the resource, wherein allowing the user device access to the resource is based on determining that the user device should be allowed access to the resource. Identifying the second policy group for the user device using the user credentials may comprise determining that the first policy group has a first priority that is lower than a second priority of the second policy group and that the second policy group applies to the request to access the resource.

In some implementations, the second policy group is not automatically selected for the user device when a user logs onto the user device. The method may comprise applying the second policy group to communications for the user device for a predetermined period of time. The method may comprise initiating a timer for the predetermined period of time upon receipt of the user credentials from the user device. The method may comprise initiating a timer for the predetermined period of time has passed upon receipt of a most recent request from the user device, wherein the timer expires when the data processing apparatus does not receive another request from the user device for the predetermined period of time. The method may comprise applying the first policy group to communications for the user device after expiration of the predetermined period of time. The method may comprise creating an entry in a log indicating the user device's access to the resource and a user corresponding with the user credentials received from the user device.

The subject matter described in this specification may be implemented in various implementations to realize one or more of the following potential advantages. In some implementations, a system allows a user to override a soft website block with the same user credentials that allow the user to log onto the system or a device included in the system. In some implementations, requiring a user to provide their credentials may allow a system to verify that the user, to whom the credentials belong, is requesting access to the blocked website and not another, different user. In some implementations, a system may allow a user to access some types of previously restricted content upon receipt of the user's login credentials.

Details of one or more implementations are set forth in the accompanying drawings and the description below. Other features, aspects, and potential advantages will become apparent from the description, the drawings, and the claims.

BRIEF DESCRIPTION OF THE DRAWINGS

Like reference numbers and designations in the various drawings indicate like elements.

DETAILED DESCRIPTION

An access control server may receive a resource request from a user device, e.g., in response to a user requesting that the user device present a webpage to the user, and determine that the user device currently should not have access to the requested resource upon determining that a first policy group currently applies to the user device. The access control server may provide the user device with a redirect to a different webpage that requests user credentials from the user and, upon receipt of user credentials by the server, the server identifies a second policy group for the user device.

When applying the second policy group to communications with the user device, the server may allow the user device access to the previously restricted resource and provide access to additional resources that are restricted by the first policy group. The user device may access the previously restricted resources for a predetermined period of time until the access control server applies the first policy group to communications to the user device, e.g., upon expiration of a session for the second policy group.

The access control server may create a log that indicates that the user device requested access to the particular restricted resource, provided the same user credentials for the user device that allow the user to log onto the user device, and accessed the particular restricted resource. The log may be used to verify which user requested and accessed the particular restricted resource.

Figure 1A:
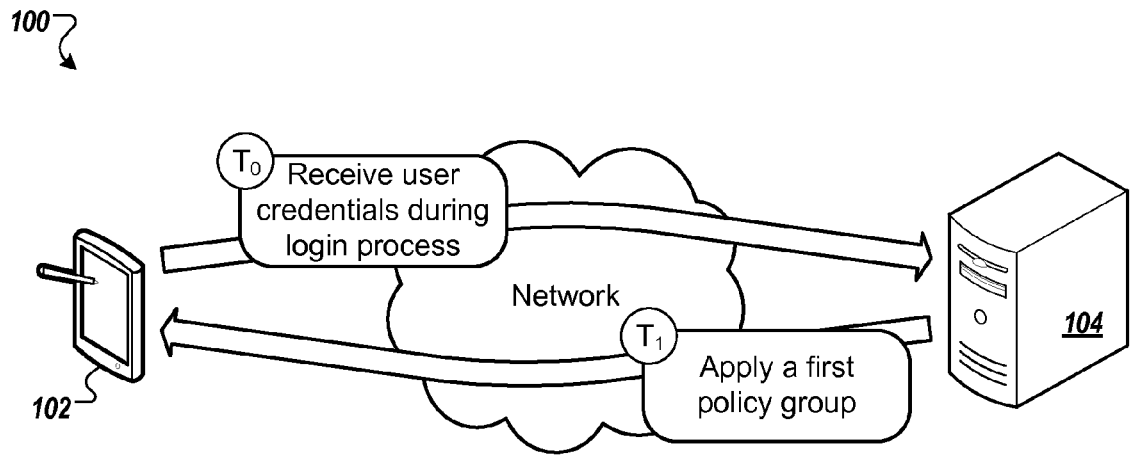
FIGS. 1A-C show an example of a network system configured to allow a user device access to a restricted website upon receipt of a corresponding user's login credentials.
Figure 1B:
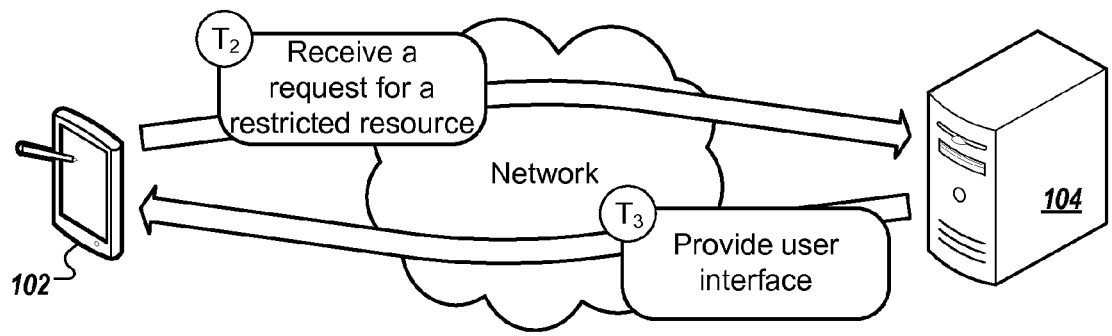
Figure 1C:
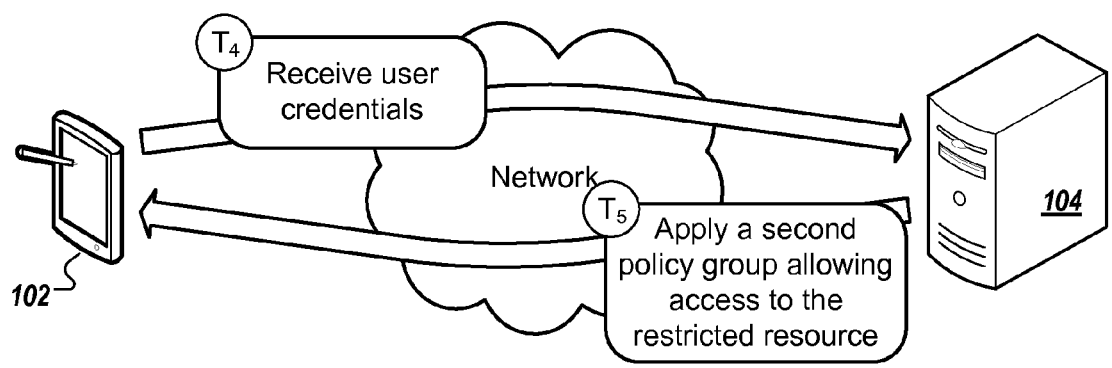

FIGS. 1A-C show an example of a network system 100 configured to allow a user device 102 access to a restricted website upon receipt of a corresponding user's login credentials. At $T_0$, an access control server 104 receives user credentials during a login process. For example, an operator of the user device 102, e.g., a teacher, may login to the user device 102 and the user device 102 may verify the user credentials with the access control server 104.

Based on the receipt of the user credentials, the access control server 104 applies a first policy group to communications to and from the user device 102 at $T_1$. For example, the access control server 104 may determine that multiple policy groups could be applied to the user device 102, selects a policy group with a priority higher than the priorities of the other policy groups, and applies the policies in the selected policy group to communications for the user device 102.

The teacher, and any other operators of the user device 102, e.g., other teachers and/or students, may employ the user device 102 to access webpages allowed by the first policy group, e.g., a news website.

At $T_2$, the access control server 104 receives a request for a resource that is restricted based on the policies in the first policy group. For example, the user device 102 sends a request to print a document on a network printer and the access control server 104, or another device, prevents the document from printing on the network printer using the first policy group.

For instance, the teacher or a student requests that the user device 102 print the document on the network printer. The printer uses a policy from the first policy group to determine that the user device 102 currently does not have privileges to print documents from the printer and does not print the requested document.

In response to the receipt of the request for the restricted resource, from the user device 102 or the other device, e.g., the printer, the access control server 104 provides, at $T_3$, the user device 102 with a user interface that includes one or more fields for user credentials. For instance, the user interface may include a password entry field that receives input indicating a user's password.

The user device 102 presents the user interface and, at $T_4$, receives user credentials, entered in the user interface, from the user operating the user device 102. For example, the user operates a keyboard, either physical or virtual, included in the user device 102 to enter the same password used during the login process. In some examples, the user interface may not include a field for a username. For example, the access control server 104 may determine the username using an identifier of the user device 102, e.g., when the user device 102 is assigned to a single user, or by determining the most recent user to log onto the user device 102.

The user device 102 presents the user interface on a display to allow the teacher or the student that requested the printing of the document to override the block by the first policy group that stops the printer from printing the document. When the teacher views the user interface, the teacher may enter their credentials, i.e., their logon credentials used at $T_0$, in the user interface to override the blocked resource request. When the student views the user interface, the student may enter their own login credentials, e.g., when the student has an email account with the system, but the access control server 104 will prevent the student from accessing the requested resource, assuming that the passwords for the student and the teacher are different when the user interface requests only the password and not a username.

At $T_5$, the access control server 104 applies a second policy group to communications to and from the user device 102. The second policy group allows access to the restricted resource. The user device 102 may send a second request for the restricted resource, e.g., the printer or a previously restricted web page, or may be provided access to the restricted resource based on the previous request, e.g., sent at $T_2$.

For instance, the access control server 104 would allow the teacher to access the restricted resource, e.g., and print the requested document on the network printer. When the student requested the restricted resource, the access control server 104 would prevent the student from accessing the restricted resource, e.g., and not allow the printer to print the requested document.

In some implementations, the user interface includes a "continue" button that allows the user device 102 to resend the request for the previously restricted resource. For example, the user device 102 may receive credentials from the user, i.e., the same credentials used by the user to log onto the user device 102, and input indicating selection of the continue button, and send the credentials and a second request for the restricted resource to the access control server 104. The access control server 104 receives the credentials, verifies the credentials, and, upon verification of the credentials, forwards the second request for the restricted resource to another device as necessary. The other device or the access control server 104 may then provide the user device 102 with access to the restricted resource.

The access control server 104 may use the verification of the user operating the user device 102 to confirm that only authorized users have access to particular resources, such as a printer, scanner, or particular websites, while preventing unauthorized users from accessing these restricted resources. For instance, the access control server 104 may employ the soft block override in a school environment to confirm that a teacher is requesting fifty copies of a particular document and to prevent a student from printing documents on their own. The access control server 104, or another device, may employ the soft block override in another type of organization to ensure that when a user is not monitoring a user device, e.g., when the user walks away from their office without locking the user device, another user does not access resources with the user device that would otherwise be restricted for the other user. The access control server 104 may also log soft block overrides as verification that a specific user requested a particular resource, e.g., when a system charges the specific user for printing pages.

Figure 2:
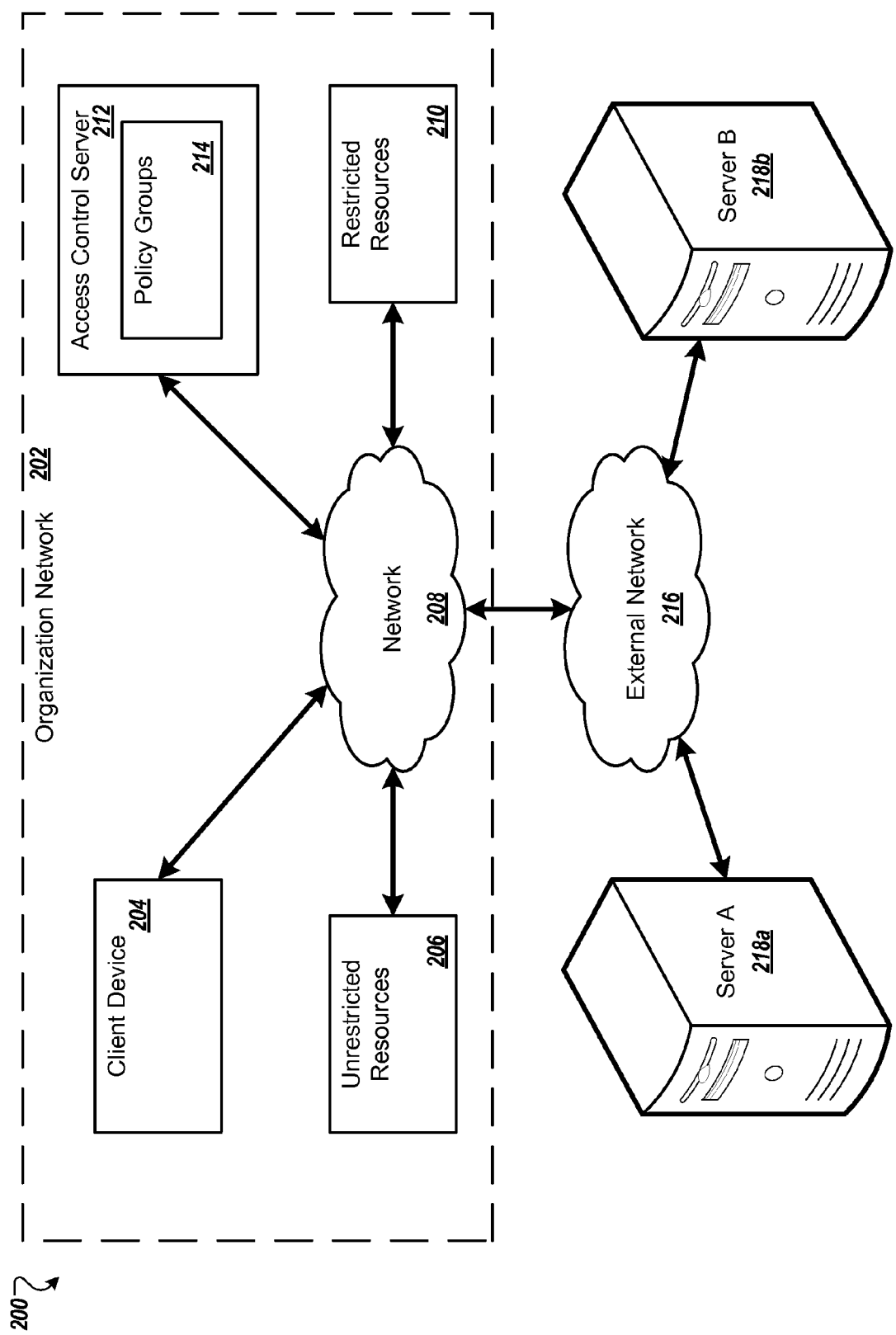
FIG. 2 is a block diagram of an environment in which an organization network allows a client device to override a block of a restricted website using a user's login credentials.

FIG. 2 is a block diagram of an environment 200 in which an organization network 202 allows a client device 204 to override a block of a restricted website using a user's login credentials. The client device 204 may allow one or more users to sign on and operate the client device 204 to access multiple unrestricted resources 206 using a network 208.

When the client device 204 requests access to a restricted resource 210, the client device 204 is prevented from accessing the restricted resource 210, e.g., by the requested restricted resource or an access control server 212. The access control server 212 then provides the client device 204 with instructions to present a user interface that requests login credentials from the user operating the client device 204.

Upon receipt of login credentials from the client device 204, the access control server 212 applies another policy group, e.g., from multiple policy groups 214, to the client device 204. The other policy group is selected based on the user groups with which the client device 204 is associated and all of the policy groups associated with those user groups.

For example, when a user first logs onto the client device 204, the client device 204 receives logon credentials from the user and provides a message to the access control server 212 indicating the user that logged onto the client device 204. For instance, the message may include an identifier of the user and/or the user credentials, e.g., in an encrypted form.

The access control server 212 uses the identifier of the user or the user credentials to determine a set of user groups to which the user belongs, and a highest priority user groups from the set of user groups. For example, if the user is associated with a teachers user group with a priority of twelve and a principles user group with a priority of fifty-six, the access control server 212 selects the principles user group.

The access control server 212 identifies the policy groups that correspond with the selected user group. For example, the access control server 212 may determine that the principles user group corresponds with a principles policy group A and a principles policy group B and that the principles policy group B is an override policy group that is not assigned to user devices when a user logs onto a user device but may be applied to communications with a user device upon receipt of credentials and a request for access to a restricted resource from a user device.

The access control server 212 applies a highest priority policy group to communications to and from the client device 204. In this example, the access control server 212 applies the principles policy group A to communications with the client device 204. In another example, when both the principles policy group A, with a priority of eleven, and a principles policy group C, with a priority of six, are not override policy groups, the access control server 212 would also apply the principles policy group A to communications with the client device 204.

When the access control server 212 determines that the client device 204 requested access to one of the restricted resources 210, the access control server 212 provides the client device 204 with instructions for a user interface that requests credentials from the user operating the client device 204, e.g., that requests the user's password or the user's username and password, and includes a continue button. The client device 204 presents the user interface and may receive credentials from the user, e.g., entered using an input device, and selection of the continue button. The access control server 212 receives an indication of the selection of the continue button from the client device 204, e.g., as an override request, and the user's credentials, e.g., in an encrypted format.

Upon verification of the user's credentials, the access control server 212 determines which policy group to apply to communications with the client device 204. For instance, the access control server 212 determines, using the user groups associated with the client device 204 and/or the user operating the client device 204, that the access control server 212 should apply either the principles policy group A, with a priority of eleven, or the principles policy group B, with a priority of twelve. The access control server 212 may determine that the principles policy group B is an override policy group, that override policy groups can be applied to the current communication request, e.g., based on receipt of an override request from the client device 204, and that the principles policy group B has a higher priority than the principles policy group A.

The access control server 212 may create a new session for the client device 204 and apply the principles policy group B to communications to and from the client device 204 for the duration of the new session. For example, the access control server 212 may terminate the new session with the client device 204 after a predetermined period of time or upon receiving indication of selection of a logout button presented on the client device 204, e.g., indicating that the user has logged out of the client device 204 or logged out of the new session during which the principles policy group B was applied to communications with the client device 204.

The access control server 212 and the organization network 202 maintain only one set of credentials for each user that accesses the organization network 202. This set of credentials, e.g., username and password, is used by the user to log onto network devices and override blocked websites.

The access control server 212, or another device in the organization network 202, may maintain a log that identifies when the client device 204 accesses a restricted resource upon receipt of logon credentials from the client device 204. The organization network 202 may use the log to verify which user devices are accessing specific resources.

In some implementations, the client device 204 may be prevented from accesses any resources connected to an external network 216 without providing user credentials with an override request to the access control server 212. For example, the access control server 212 may prevent the client device 204 from accessing multiple servers A-B 218a-b, provide the client device 204 with instructions for a user interface requesting credentials from the user operating the client device 204, and then allow the client device 204 to access one or more of the servers A-B 218a-b upon receipt of an override request and user credentials, assuming an override policy group allows the client device 204 to access the servers A-B 218a-b.

In some implementations, the client device 204 may have access to the server A 218a without sending an override request and user credentials to the access control server 212 but may need to send an override request and user credentials to the access control server 212 to gain access to resources hosted by the server B 218b.

In some implementations, an override policy group may not provide the client device 204 with access to some restricted resources. For instance, the principles policy group A may allow the client device to access the unrestricted resources 206 and the server A 218a and the principles policy group B may allow the client device to access the unrestricted resources 206, the restricted resources 210, and the server A 218a but not the server B 218b.

The client device 204 may include a personal computer, a mobile communication device, or another device that can send and receive data over the network 208. The network 208, such as a local area network (LAN), wide area network (WAN), the Internet, or a combination thereof, connects the client device 204, the access control server 212, the unrestricted resources 206, the restricted resources 210, and the external network 216.

Figure 3:
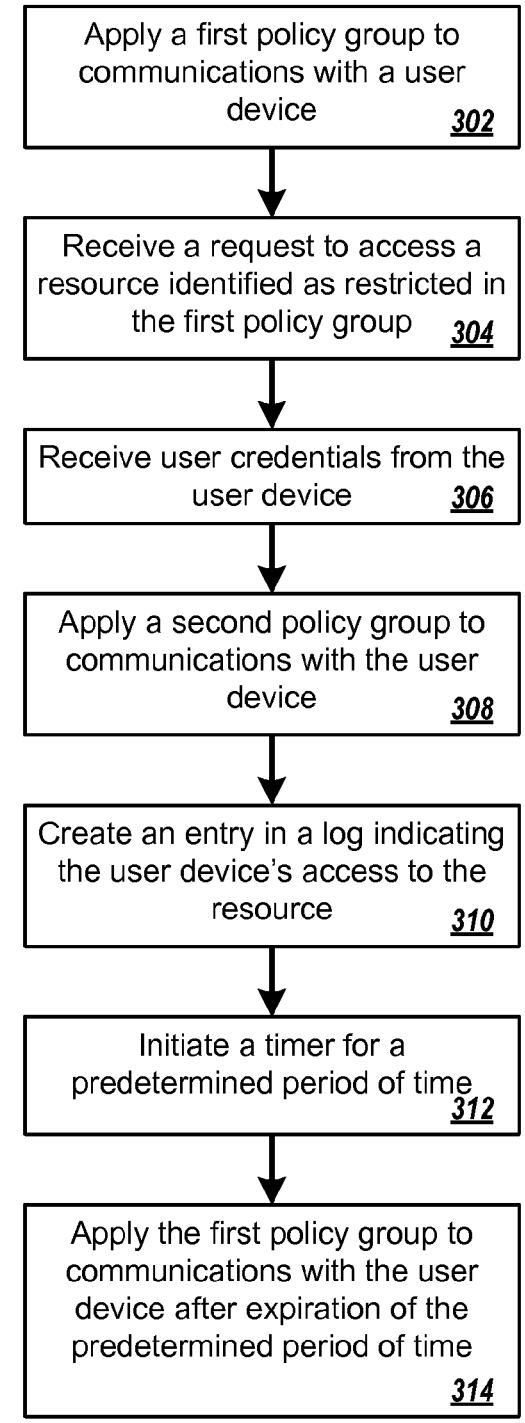
FIG. 3 is a flow diagram of a process for applying a second policy group to communications from a user device.

FIG. 3 is a flow diagram of a process 300 for applying a second policy group to communications from a user device. For example, the process 300 can be used by the access control server 212 from the environment 200.

The process applying a first policy group to communications with a user device (302). For instance, the access control server applies the principles policy group A to the user device.

The process receives a request to access a resource identified as restricted in the first policy group (304). For example, the access control server receives a request to access content hosted on a restricted server.

The process receives user credentials with the user device (306). For example, the access control server receives an override request and the user credentials from the user device in response to a user interface presented on the user device.

The process applies a second policy group to communications from the user device (308). For instance, the access control server applies the principles policy group B to the user device.

The process creates an entry in a log indicating the user device's access to the resource (310). For example, the entry in the log identifies the user device, the user operating the user device, and the specific resource accessed by the user device that was previously restricted. The access control server may create an entry for each resource accessed by the user device, each previously restricted resource access by the user device, or each resource accessed by the user device while the access control server applies the second policy group to communications to and from the user device.

The process initiates a timer for a predetermined period of time (312). For example, upon applying the second policy group to communications with the user device, the access control server initiates the timer. The duration of the timer may be predetermined by an operator of the access control server, e.g., fifteen minutes.

The process applies the first policy group to communications with the user device after expiration of the predetermined period of time (314). For instance, the access control server determines that the timer expired and revokes the user device's access to the restricted resources by applying the first policy group to communications with the user device.

In some implementations, the access control server may re-initialize the timer upon receipt of another resource request. For instance, the access control server may re-initialize the timer upon receiving a request for any resource from the user device. In some examples, the access control server may re-initialize the timer upon receiving a request for a resource that is restricted based on the first policy group.

The order of steps in the process 300 described above is illustrative only, and applying the second policy group to communications from the user device can be performed in different orders.

In some implementations, the process 300 can include additional steps, fewer steps, or some of the steps can be divided into multiple steps. For example, the access control server may apply the first policy group, receive the request to access the restricted resource, receive user credentials from the user device, and apply the second policy group, e.g., perform steps 302-308, without creating an entry in the log, and/or initiating the timer, e.g., performing steps 310-314.

Figure 4:
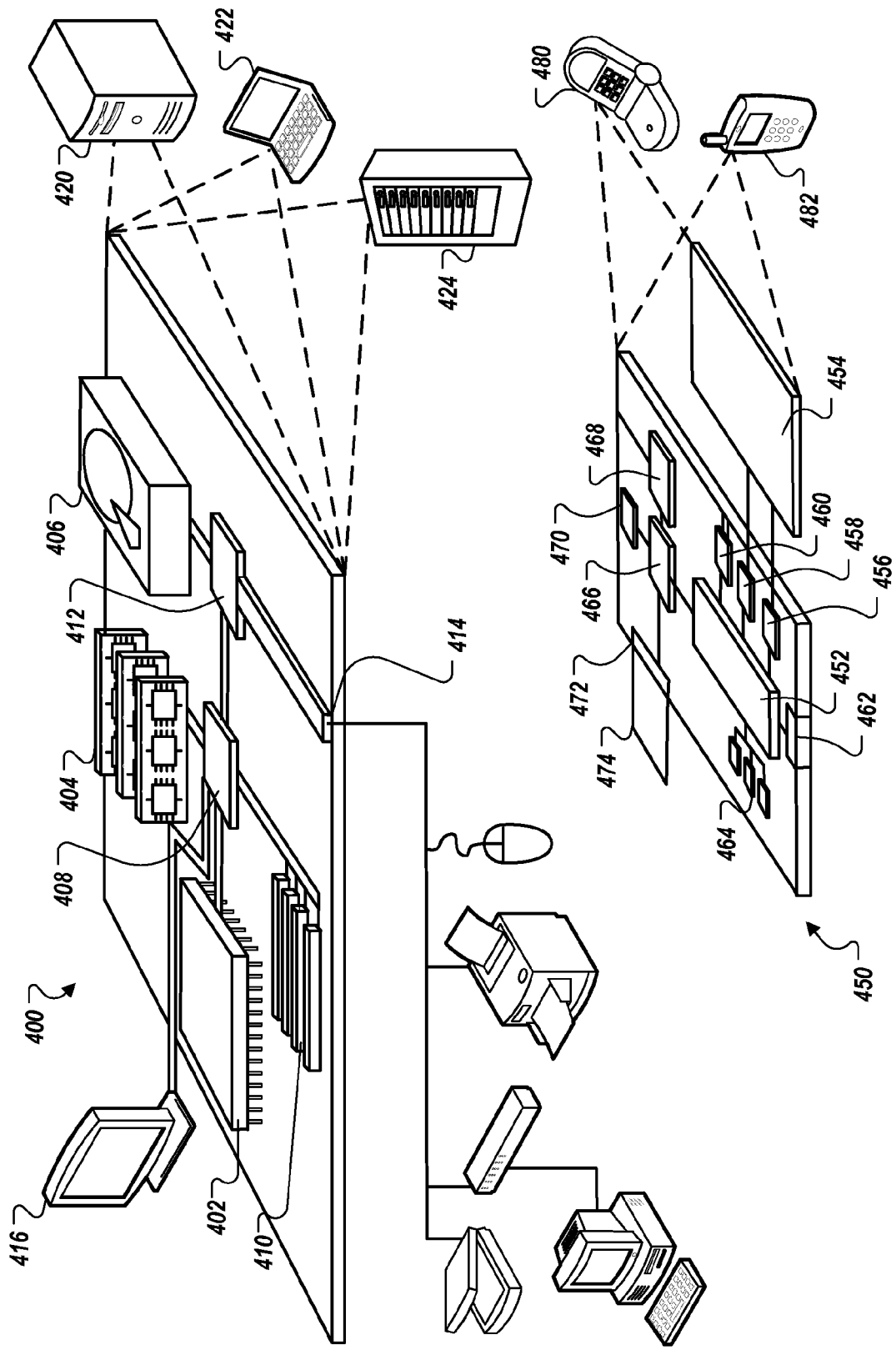
FIG. 4 is a block diagram of computing devices that may be used to implement the systems and methods described in this document.

FIG. 4 is a block diagram of computing devices 400, 450 that may be used to implement the systems and methods described in this document, as either a client or as a server or plurality of servers. Computing device 400 is intended to represent various forms of digital computers, such as laptops, desktops, workstations, personal digital assistants, servers, blade servers, mainframes, and other appropriate computers. Computing device 450 is intended to represent various forms of mobile devices, such as personal digital assistants, cellular telephones, smartphones, and other similar computing devices. Additionally computing device 400 or 450 can include Universal Serial Bus (USB) flash drives. The USB flash drives may store operating systems and other applications. The USB flash drives can include input/output components, such as a wireless transmitter or USB connector that may be inserted into a USB port of another computing device. The components shown here, their connections and relationships, and their functions, are meant to be exemplary only, and are not meant to limit implementations of the inventions described and/or claimed in this document.

Computing device 400 includes a processor 402, memory 404, a storage device 406, a high speed interface 408 connecting to memory 404 and high speed expansion ports 410, and a low speed interface 412 connecting to low speed bus 414 and storage device 406. Each of the components 402, 404, 406, 408, 410, and 412, are interconnected using various busses, and may be mounted on a common motherboard or in other manners as appropriate. The processor 402 can process instructions for execution within the computing device 400, including instructions stored in the memory 404 or on the storage device 406 to display graphical information for a GUI on an external input/output device, such as display 416 coupled to high speed interface 408. In other implementations, multiple processors and/or multiple buses may be used, as appropriate, along with multiple memories and types of memory. Also, multiple computing devices 400 may be connected, with each device providing portions of the necessary operations (e.g., as a server bank, a group of blade servers, or a multi-processor system).

The memory 404 stores information within the computing device 400. In one implementation, the memory 404 is a volatile memory unit or units. In another implementation, the memory 404 is a non-volatile memory unit or units. The memory 404 may also be another form of computer-readable medium, such as a magnetic or optical disk.

The storage device 406 is capable of providing mass storage for the computing device 400. In one implementation, the storage device 406 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 404, the storage device 406, or memory on processor 402.

The high speed controller 408 manages bandwidth-intensive operations for the computing device 400, while the low speed controller 412 manages lower bandwidth-intensive operations. Such allocation of functions is exemplary only. In one implementation, the high speed controller 408 is coupled to memory 404, display 416 (e.g., through a graphics processor or accelerator), and to high speed expansion ports 410, which may accept various expansion cards (not shown). In the implementation, low speed controller 412 is coupled to storage device 406 and low speed expansion port 414. The low speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 420, or multiple times in a group of such servers. It may also be implemented as part of a rack server system 424. In addition, it may be implemented in a personal computer such as a laptop computer 422. Alternatively, components from computing device 400 may be combined with other components in a mobile device (not shown), such as device 450. Each of such devices may contain one or more of computing device 400, 450, and an entire system may be made up of multiple computing devices 400, 450 communicating with each other.

Computing device 450 includes a processor 452, memory 464, an input/output device such as a display 454, a communication interface 466, and a transceiver 468, among other components. The device 450 may also be provided with a storage device, such as a microdrive or other device, to provide additional storage. Each of the components 450, 452, 464, 454, 466, and 468, are interconnected using various buses, and several of the components may be mounted on a common motherboard or in other manners as appropriate.

The processor 452 can execute instructions within the computing device 450, including instructions stored in the memory 464. The processor may be implemented as a chipset of chips that include separate and multiple analog and digital processors. Additionally, the processor may be implemented using any of a number of architectures. For example, the processor 402 may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 450, such as control of user interfaces, applications run by device 450, and wireless communication by device 450.

Processor 452 may communicate with a user through control interface 458 and display interface 456 coupled to a display 454. The display 454 may be, for example, a TFT (Thin-Film-Transistor Liquid Crystal Display) display or an OLED (Organic Light Emitting Diode) display, or other appropriate display technology. The display interface 456 may comprise appropriate circuitry for driving the display 454 to present graphical and other information to a user. The control interface 458 may receive commands from a user and convert them for submission to the processor 452. In addition, an external interface 462 may be provide in communication with processor 452, so as to enable near area communication of device 450 with other devices. External interface 462 may provide, for example, for wired communication in some implementations, or for wireless communication in other implementations, and multiple interfaces may also be used.

The memory 464 stores information within the computing device 450. The memory 464 can be implemented as one or more of a computer-readable medium or media, a volatile memory unit or units, or a non-volatile memory unit or units. Expansion memory 474 may also be provided and connected to device 450 through expansion interface 472, which may include, for example, a SIMM (Single In Line Memory Module) card interface. Such expansion memory 474 may provide extra storage space for device 450, or may also store applications or other information for device 450. Specifically, expansion memory 474 may include instructions to carry out or supplement the processes described above, and may include secure information also. Thus, for example, expansion memory 474 may be provide as a security module for device 450, and may be programmed with instructions that permit secure use of device 450. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 464, expansion memory 474, or memory on processor 452 that may be received, for example, over transceiver 468 or external interface 462.

Device 450 may communicate wirelessly through communication interface 466, which may include digital signal processing circuitry where necessary. Communication interface 466 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 468. In addition, short-range communication may occur, such as using a Bluetooth, WiFi, or other such transceiver (not shown). In addition, GPS (Global Positioning System) receiver module 470 may provide additional navigation- and location-related wireless data to device 450, which may be used as appropriate by applications running on device 450.

Device 450 may also communicate audibly using audio codec 460, which may receive spoken information from a user and convert it to usable digital information. Audio codec 460 may likewise generate audible sound for a user, such as through a speaker, e.g., in a handset of device 450. Such sound may include sound from voice telephone calls, may include recorded sound (e.g., voice messages, music files, etc.) and may also include sound generated by applications operating on device 450.

The computing device 450 may be implemented in a number of different forms, as shown in the figure. For example, it may be implemented as a cellular telephone 480. It may also be implemented as part of a smartphone 482, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

This document describes technologies that can be applied to a wide range of uses, which are designed and intended to be beneficial for all users involved. However, some of the technologies described may be put to illegitimate, malicious, and even illegal ends by bad actors. This is true with almost any technology, but there is often a greater sensitivity when a technology interacts with a user's security and private information. The described technologies all are designed to operate in an environment and in a manner that respects the rights of all users. As such, features such as user notification, opt-in and opt-out procedures, and privacy settings are available options to be used to ensure user security and privacy are respected.

Although a few implementations have been described in detail above, other modifications are possible. In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other implementations are within the scope of the following claims.

What is claimed is:

1. A method performed by data processing apparatus, the method comprising:
receiving first user credentials from a user device during a login process that provides a user access to the user device;
identifying, using the first user credentials, a first policy group for the user device and a second policy group for the user device in response to receiving the first user credentials from the user device during the login process;
determining that the first policy group should be associated with the user device based on the receipt of the first user credentials during the login process;
applying the first policy group to communications for the user device;
receiving, from the user device, a request to access a resource;
determining, using the first policy group, that the user device should be prevented from accessing the resource;
providing, to the user device and based on determining that the user device should be prevented from accessing the resource, instructions for presentation of a user interface including a user credentials field;
receiving second user credentials from the user device;
determining that the second user credentials are the same as the first user credentials used during the login process;
determining that the first policy group has a first priority that is lower than a second priority of the second policy group and that the second policy group applies to the request to access the resource, wherein a policy group with a higher priority is always selected over a policy group with a lower priority except during a login process when the higher priority policy group is flagged as not for use during the login process;
determining, using the second policy group, that the user device should be allowed access to the resource; and
allowing the user device access to the resource based on determining that the user device should be allowed access to the resource.

2. The method of claim 1, wherein determining that the first policy group should be associated with the user device based on the receipt of the first user credentials during the login process comprises determining that the second policy group is flagged as not for use during a login process when a user logs onto the user device.

3. The method of claim 1, comprising:
applying the second policy group to communications for the user device for a predetermined period of time.

4. The method of claim 3, comprising:
initiating a timer for the predetermined period of time upon receipt of the user credentials from the user device.

5. The method of claim 3, comprising:
initiating a timer for the predetermined period of time upon receipt of a most recent request from the user device, wherein the timer expires when the data processing apparatus does not receive another request from the user device for the predetermined period of time.

6. The method of claim 3, comprising:
applying the first policy group to communications for the user device after expiration of the predetermined period of time.

7. The method of claim 1, comprising:
creating an entry in a log indicating the user device's access to the resource and a user corresponding with the user credentials received from the user device.

8. The method of claim 7, comprising:
adding entries to the log only for resources that were restricted using the first policy group.

9. The method of claim 7, comprising:
adding entries to the log only for resources accessed by the user device while the second policy group is applied to communications for the user device.

10. The method of claim 1, wherein:
receiving the first user credentials from the user device during the login process that provides the user access to the user device comprises receiving, by a first device different from the user device, the first user credentials; and
receiving the second user credentials from the user device comprises receiving, by the first device, the second user credentials.

11. The method of claim 1, wherein:
receiving the first user credentials from the user device during the login process that provides the user access to the user device comprises receiving the first user credentials across a network; and
receiving the second user credentials from the user device comprises receiving the second user credentials across the network.

12. The method of claim 1, wherein receiving the second user credentials from the user device comprises receiving the second user credentials that were entered into the user interface when the user device presented the user interface to the user.

13. A system comprising:
one or more computers and one or more storage devices storing instructions that are operable, when executed by the one or more computers, to cause the one or more computers to perform operations comprising:
receiving first user credentials from a user device during a login process that provides a user access to the user device;
identifying, using the first user credentials, a first policy group for the user device and a second policy group for the user device in response to receiving the first user credentials from the user device during the login process;
determining that the first policy group should be associated with the user device based on the receipt of the first user credentials during the login process;
applying the first policy group to communications for the user device;
receiving, from the user device, a request to access a resource;
determining, using the first policy group, that the user device should be prevented from accessing the resource;
providing, to the user device and based on determining that the user device should be prevented from accessing the resource, instructions for presentation of a user interface including a user credentials field;
receiving second user credentials from the user device;
determining that the second user credentials are the same as the first user credentials used during the login process;
determining that the first policy group has a first priority that is lower than a second priority of the second policy group and that the second policy group applies to the request to access the resource, wherein a policy group with a higher priority is always selected over a policy group with a lower priority except during a login process when the higher priority policy group is flagged as not for use during the login process;
determining, using the second policy group, that the user device should be allowed access to the resource; and
allowing the user device access to the resource based on determining that the user device should be allowed access to the resource.

14. The system of claim 13, wherein determining that the first policy group should be associated with the user device based on the receipt of the first user credentials during the login process comprises determining that the second policy group is flagged as not for use during a login process when a user logs onto the user device.

15. The system of claim 13, the operations comprising:
applying the second policy group to communications for the user device for a predetermined period of time.

16. The system of claim 15, the operations comprising:
initiating a timer for the predetermined period of time upon receipt of the user credentials from the user device.

17. The system of claim 15, the operations comprising:
initiating a timer for the predetermined period of time upon receipt of a most recent request from the user device, wherein the timer expires when one of the computers does not receive another request from the user device for the predetermined period of time.

18. The system of claim 15, the operations comprising:
applying the first policy group to communications for the user device after expiration of the predetermined period of time.

19. The system of claim 13, the operations comprising:
creating an entry in a log indicating the user device's access to the resource and a user corresponding with the user credentials received from the user device.

20. The system of claim 19, the operations comprising:
adding entries to the log only for resources that were restricted using the first policy group.

21. The system of claim 19, the operations comprising:
adding entries to the log only for resources accessed by the user device while the second policy group is applied to communications for the user device.

22. The system of claim 13, the operations comprising:
receiving the first user credentials from the user device during the login process that provides the user access to the user device comprises receiving, by at least one of the computers different from the user device, the first user credentials; and
receiving the second user credentials from the user device comprises receiving, by the at least one of the computers, the second user credentials.

23. The system of claim 13, wherein:
receiving the first user credentials from the user device during the login process that provides the user access to the user device comprises receiving the first user credentials across a network by at least one of the computers; and
receiving the second user credentials from the user device comprises receiving the second user credentials across the network by at least one of the computers.

24. The system of claim 13, wherein receiving the second user credentials from the user device comprises receiving the second user credentials that were entered into the user interface when the user device presented the user interface to the user.

25. A non-transitory computer storage medium encoded with instructions that, when executed by one or more computers, cause the one or more computers to perform operations comprising:
receiving first user credentials from a user device during a login process that provides a user access to the user device;
identifying, using the first user credentials, a first policy group for the user device and a second policy group for the user device in response to receiving the first user credentials from the user device during the login process;
determining that the first policy group should be associated with the user device based on the receipt of the first user credentials during the login process;
applying the first policy group to communications for the user device;
receiving, from the user device, a request to access a resource;

determining, using the first policy group, that the user device should be prevented from accessing the resource;

providing, to the user device and based on determining that the user device should be prevented from accessing the resource, instructions for presentation of a user interface including a user credentials field;

receiving second user credentials from the user device;

determining that the second user credentials are the same as the first user credentials used during the login process;

determining that the first policy group has a first priority that is lower than a second priority of the second policy group and that the second policy group applies to the request to access the resource, wherein a policy group with a higher priority is always selected over a policy group with a lower priority except during a login process when the higher priority policy group is flagged as not for use during the login process;

determining, using the second policy group, that the user device should be allowed access to the resource; and allowing the user device access to the resource based on determining that the user device should be allowed access to the resource.

26. The computer storage medium of claim 25, wherein determining that the first policy group should be associated with the user device based on the receipt of the first user credentials during the login process comprises determining that the second policy group is flagged as not for use during a login process when a user logs onto the user device.

27. The computer storage medium of claim 25, the operations comprising:

applying the second policy group to communications for the user device for a predetermined period of time.

28. The computer storage medium of claim 27, the operations comprising:

initiating a timer for the predetermined period of time upon receipt of the user credentials from the user device.

29. The computer storage medium of claim 27, the operations comprising:

initiating a timer for the predetermined period of time upon receipt of a most recent request from the user device, wherein the timer expires when one of the computers does not receive another request from the user device for the predetermined period of time.

30. The computer storage medium of claim 27, the operations comprising:

applying the first policy group to communications for the user device after expiration of the predetermined period of time.

31. The computer storage medium of claim 25, the operations comprising:

creating an entry in a log indicating the user device's access to the resource and a user corresponding with the user credentials received from the user device.

32. The computer storage medium of claim 31, the operations comprising:

adding entries to the log only for resources that were restricted using the first policy group.

33. The computer storage medium of claim 31, the operations comprising:

adding entries to the log only for resources accessed by the user device while the second policy group is applied to communications for the user device.

34. The computer storage medium of claim 25, the operations comprising:

receiving the first user credentials from the user device during the login process that provides the user access to the user device comprises receiving, by at least one of the computers different from the user device, the first user credentials; and receiving the second user credentials from the user device comprises receiving, by the at least one of the computers, the second user credentials.

35. The computer storage medium of claim 25, wherein:

receiving the first user credentials from the user device during the login process that provides the user access to the user device comprises receiving the first user credentials across a network by at least one of the computers; and receiving the second user credentials from the user device comprises receiving the second user credentials across the network by at least one of the computers.

36. The computer storage medium of claim 25, wherein receiving the second user credentials from the user device comprises receiving the second user credentials that were entered into the user interface when the user device presented the user interface to the user.

* * * * *